C. CONDERMAN.
STEPS FOR PLATFORM WAGONS.
No. 190,557. Patented May 8, 1877.
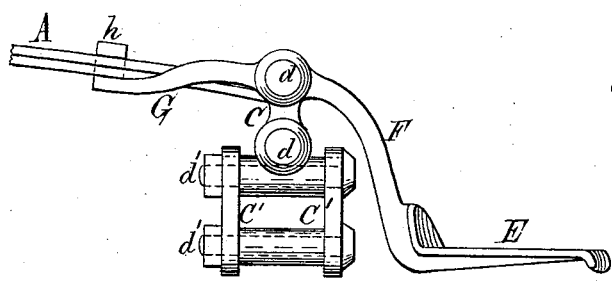
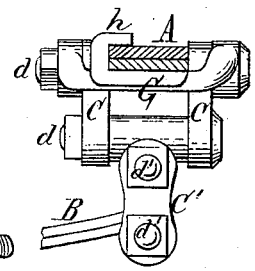
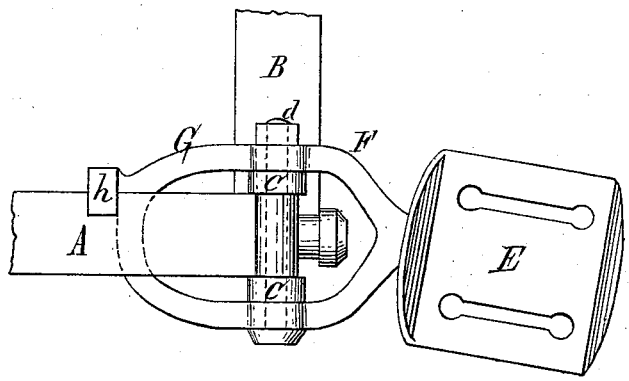

UNITED STATES PATENT OFFICE.

CALEB CONDERMAN, OF HORNELLSVILLE, NEW YORK.

IMPROVEMENT IN STEPS FOR PLATFORM-WAGONS.

Specification forming part of Letters Patent No. 190,557, dated May 8, 1877; application filed April 4, 1877.

*To all whom it may concern:*

Be it known that I, CALEB CONDERMAN, of Hornellsville, in the county of Steuben and State of New York, have invented certain new and useful Improvements in Wagon-Steps, which improvements are fully set forth in the following specification, reference being had to the accompanying drawing.

My invention relates to a step designed to be secured to the forward springs of a platform spring-wagon at the point where the side spring connects with the cross-spring.

The object of my invention is to provide the step with a simple and efficient fastening, by means of which it is readily secured to the spring and firmly held thereon, so as to sustain the step in nearly the same position whether the wagon is light or loaded.

In the accompanying drawing, Figure 1 is a side elevation of a wagon-step attached to the springs by my improved fastening. Fig. 2 is a front elevation, and Fig. 3 a top-plan view, thereof.

Like letters of reference refer to like parts in each of the figures.

A represents the rear end of the forward side spring of a spring platform-wagon, and B the end of the cross-spring connecting the rear ends of the side springs. C and C′ are the links, and d d′ the fastening-bolts, of the universal joint or coupling, by which the ends of the cross-spring are connected with those of the side spring.

E represents the tread or plate of the step arranged in the rear of the springs A B, and F a bifurcated shank cast with the tread E, and formed so as to embrace the upper links C of the spring-coupling, the shank being secured to the latter by the upper coupling-bolt d, which passes through the shank, as shown in Fig. 3. G represents a forward extension or continuation of the bifurcated shank F, engaging under the side spring A, and provided wite a hook or lip, h, overlapping the upper side of this spring, as clearly shown in the drawing.

The extension G of the shank and hook h firmly grasp the spring A, thereby securely holding the tread in the same position relative to the spring, while the movements of the side and cross springs and of the universal coupling connecting the same are in no manner interfered with by the step-fastening.

The step provided with my improved fastening is readily cast complete, and secured to the spring by placing the spring between the shank-extension G and hook h, and applying the upper bolt d, the whole forming a very simple, cheap, and durable fastening for the step.

Having thus fully described my invention, what I claim as new, and desire to secure by Letters Patent, is—

The tread E, provided with the bifurcated shank F secured to the spring-coupling, and extension G and hook h, engaging, respectively against the under and upper side of the spring, substantially as and for the purpose hereinbefore set forth.

CALEB CONDERMAN.

Witnesses:
I. W. NEAR,
C. L. BROWN.